July 28, 1970  MASAO MURAKAMI ETAL  3,521,728
DEVICE FOR HANGARING AUTOMOBILES
Filed March 27, 1968  2 Sheets-Sheet 1

INVENTORS
MASAO MURAKAMI
MINORU HORITA

BY Wenderoth, Lind & Ponack
ATTORNEYS

United States Patent Office 3,521,728
Patented July 28, 1970

3,521,728
DEVICE FOR HANGARING AUTOMOBILES
Masao Murakami and Minoru Horita, Fukui, Japan, assignors to Izumi Kogyo Co., Ltd., Fukui, Japan, a corporation of Japan
Filed Mar. 27, 1968, Ser. No. 716,501
Int. Cl. B66f 7/24
U.S. Cl. 187—8.56     2 Claims

ABSTRACT OF THE DISCLOSURE

A hangaring device for raising and lowering an automobile and operable by the automobile. The automobile rests on a guide plate having rollers to be driven by the wheels of the automobile. The rollers drive winding drums through a transmission. The drums wind up wiring which raises or lowers the guide plate. Preventive rollers are mounted at a small angle with the driving rollers to prevent the automobile from rolling on the guide plate. Damping means operate on the driving rollers to prevent rotation thereof when the automobile is lowered to the ground.

DETAILED EXPLANATION OF INVENTION

The invention relates to a device or mechanism for hangaring and bringing out an automobile in three-dimension by making use of the power of the automobile itself.

With respect to the aforementioned device, there is a prior invention up to now, namely, publication No. 14,762 of 1963 (utility model in Japan) and which was invented by one of co-inventors of the present invention. However, this invention has the drawbacks that there is rolling (from side to side) of an automobile per se in the course of lifting up for hangaring, and an engine must be stopped once when one is bringing out automobiles from the shed.

The present invention relates to an improvement of the afore-mentioned utility model (utility model publication No. 14,762 of 1963). More particularly, we have succeeded in overcoming such disadvantages in the said patent. The contents of the invention is now described hereinafter by referring to the attached drawings.

Figure 1:
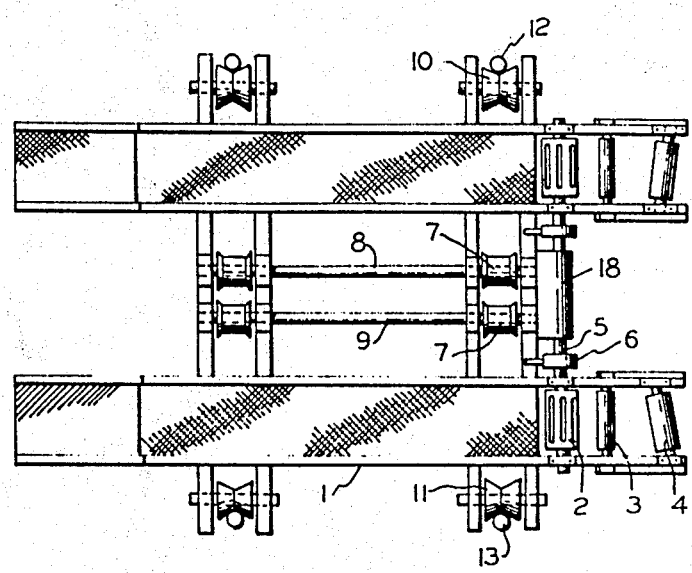
FIG. 1 is an essential part of a plan view of the practical mode embodying the present invention.
Figure 2:
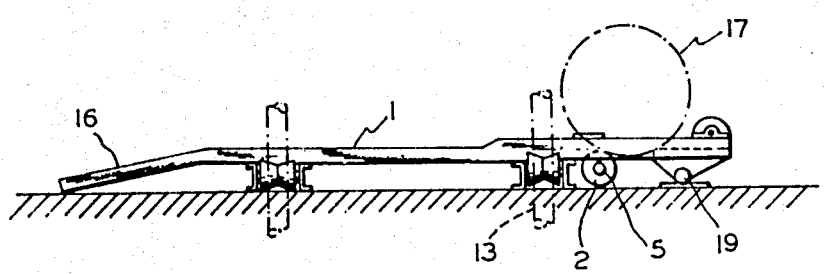
FIG. 2 is a side view of FIG. 1.
Figure 5:
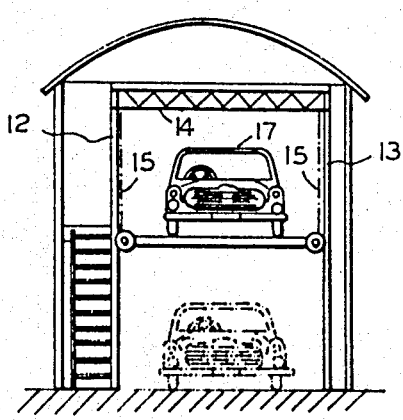
FIG 5 is a front view of hangaring in the shed.

Reference to FIGS. 1, 2 and 5 shows that driving rollers 2, 3 are set up against guiding plate 1 and roller of preventive rolling 4 fitted with a little angle against driving rollers 2, 3, a driving roller 2 which has non-skid fluting connected to the axis of rotation 5 to receive an automobile damping device 6, and placing a rotary transmission device 18 interposed between two adjacent shafts 8, 9 of winding drums and the axis of rotation 5 of driving roller 2, and guiding wheels 10, 11 being provided with the outer side of guiding plate 1. Said guiding wheels are connected to along guiding posts 12, 13 and installing the upper part of wiring 15 adapted to the outer side of guiding plate to mount the fittings-part which is situated above the guiding posts, and then the end of said wiring being fixed with winding drums 7 through guiding wheels 10, 11.

The operation of the device is illustrated in the following lines. An automobile may be driven in from slant-part 16 to guiding plate 1 and placing the wheels 17 of an automobile on driving rollers 2, 3 to make rotation of rollers 2, 3 by rotating the said wheels 17 and driving roller 2 and then roller of preventive rolling 4 begin to rotate when the guiding plate 1 being raised up little from the ground level.

Rollers of preventive rolling 4 are fixed with a certain angle against driving rollers 2, 3; for instance, 8–15°, in order to enable avoiding any rolling of an automobile, in which it is now possible to have no rolling of said automobile. The rotation of driving roller 2 connected to the axis of rotation 5 is conveyed to the adjacent shafts 8, 9 through the rotary transmission device 18 which comprising a gear box embodied with worm and worm wheel, and then winding drum 7 being to rotate. In the proceeding, guiding plate 1 boarded with an automobile on it will be lifted up by wiring 15, as one side of wiring 15 is being fixed on winding drum 7.

FIG. 5 shows the state of the lifted automobile. The position of an automobile can be freely changed by stopping the engine of an automobile. When one desires to descend an automobile, automobile's wheels may be rotated in reverse. In this case, driving roller 2 and roller of preventive rolling 4 are rotated reversely. Accordingly, winding drum 7 will also rotate in reverse way, in which an automobile on the guiding plate 1 will be descended in safety without any rolling, as wiring 15 will be unwound.

Figure 4A:
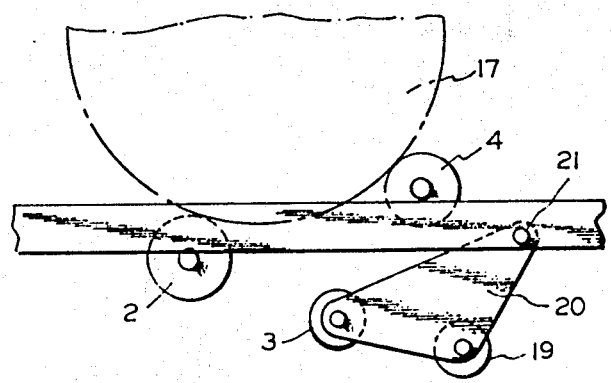
Figure 4B:
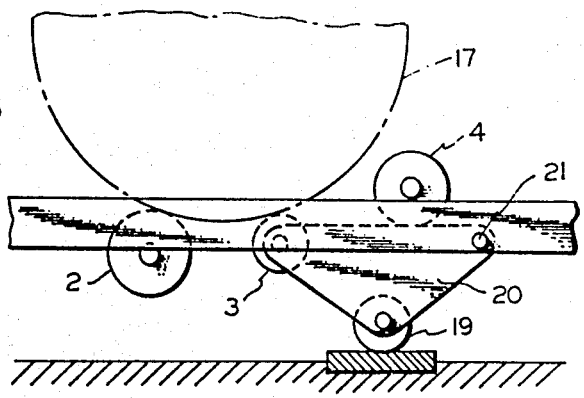

FIG. 4 shows the working operation of driving rollers 2, 3, guiding roller 19 and roller of preventive rolling 4, while it is grounding on the earth. Namely, driving roller 3 will be pushed up with fulcrum 21 when guiding roller 19 being touched on the ground, because driving roller 3 and guiding roller 19 are allowed to move up and down in fitting with plate 20 on fulcrum 21. Therefore, automobile's wheels 17 will be veered to shallowly supported driving rollers 2, 3 from deeply supported driving roller 2 and roller of preventive rolling 4. On the other hand, the rotation of driving roller 2 will be stopped simultaneously by the automatic damping device installed to the axis of rotation 5 of driving roller 2 when it touches on the earth.

Figure 3A:
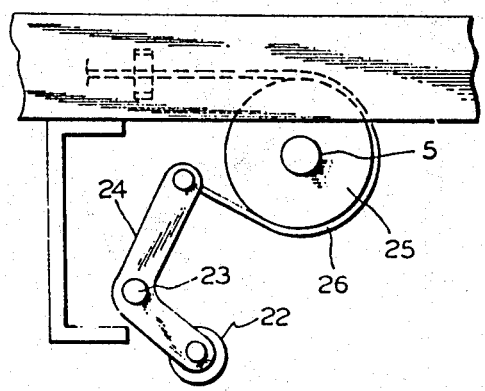
FIGS. 3A, 3B and 4A, 4B are the detailed views of the damping (braking) and roller devices, respectively, of FIGS. 1 and 2.
Figure 3B:
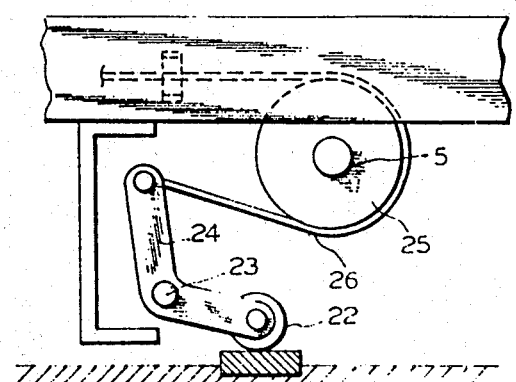

Such mechanism has been shown in FIG. 3. Namely, roller of grounding 22 which is fitted with plate 24 and it moves up and down with fulcrum 23.

When the roller of grounding 22 is being touched on the earth, it moves from A-position to B-position in FIG. 3. Accordingly, a brake band 26 coiled to brake drum 25 and the axis of rotation 5 of guiding roller 2 is to be binded to lead a driving roller 2 braked. In accordance with the aforementioned mechanism, it is possible to bring out an automobile from guiding plate 1 without having stopped its engine. Therefore, it is also possible to hangar an automobile by the rotation of its engine per se through the simple lifting device in safety and without any rolling of it, while it is in ascending and descending. Furthermore, it is possible to bring out easily an automobile by the automatic damping device without having stopped its engine. Still furthermore, it has advantages such as smaller place to be required for hangaring an automobile and less expenses for constructing the hangar including the device of the present invention.

While there have been shown and pointed out the fundamental features of the invention as applied to a preferred embodiment, it will be understood that various omissions, substitutions and changes in the form and details of the device illustrated, may be made by those skilled in the art.

What is claimed is:

1. A hangaring device for raising and lowering automobiles comprising a fixed structure, a guiding plate mounted on said structure for supporting an automobile, driving roller means mounted in said plate for rotation by the wheels of said automobile, winding drums mounted on said plate, wiring means operatively connected to said fixed structure and to said winding drums for enabling said guiding plate to be raised and lowered relative to said fixed structure, a rotary transmission means operatively mounted between said driving roller means and said winding drums to transfer rotation therebetween, preventive rolling means mounted on said guiding plate at a small angle relative to said driving roller means for preventing said automobile from rolling on said guiding plate, and damping means operatively connected to said driving roller means for stopping rotation thereof when said automobile has been lowered to the ground, whereby said automobile may be lowered and driven off said guiding plate without stopping the engine thereof.

2. A device as claimed in claim 1 wherein said driving roller means has an axis of rotation and said damping means comprises a brake drum fixed to said axis of rotation and a brake band adapted to press against said brake drum when said automobile has been lowered to the ground, whereby said driving roller means ceases rotation without the necessity of stopping said automobile engine.

References Cited

UNITED STATES PATENTS

| | | | |
|---|---|---|---|
| 1,161,982 | 11/1915 | Scheidler | 187—8.56 |
| 2,754,933 | 7/1956 | Gallay | 187—8.56 |

FOREIGN PATENTS 1,106,418  12/1955  France.

HARVEY C. HORNSBY, Primary Examiner

U.S. Cl. X.R.

214—16.1